US012598263B2

(12) United States Patent  
Hotta et al.

(10) Patent No.: US 12,598,263 B2  
(45) Date of Patent: Apr. 7, 2026

(54) PRINTING SYSTEM INCLUDING PRINTING DEVICE GENERATING IMAGE DATA AND DATA PROCESSING SERVER CALCULATING FEE TO BE CHARGED FOR FORMING IMAGE BASED ON THE IMAGE DATA

(71) Applicant: Brother Kogyo Kabushiki Kaisha, Nagoya (JP)

(72) Inventors: Ayaka Hotta, Kitanagoya (JP); Shunsuke Minamikawa, Nagoya (JP); Haruka Azechi, Nagoya (JP); Tetsuya Okuno, Nagoya (JP); Yushi Deura, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 48 days.

(21) Appl. No.: 17/935,283

(22) Filed: Sep. 26, 2022

(65) Prior Publication Data

US 2023/0016418 A1 Jan. 19, 2023

Related U.S. Application Data

(63) Continuation of application No. PCT/JP2021/010550, filed on Mar. 16, 2021.

(30) Foreign Application Priority Data

Mar. 31, 2020 (JP) ................................. 2020-063866

(51) Int. Cl.
*H04N 1/34* (2006.01)
*H04N 1/00* (2006.01)
*H04N 1/32* (2006.01)

(52) U.S. Cl.
CPC ......... *H04N 1/346* (2013.01); *H04N 1/00352* (2013.01); *H04N 1/32101* (2013.01); *H04N 2201/0094* (2013.01)

(58) Field of Classification Search
CPC ...................................................... H04N 1/346
See application file for complete search history.

(56) References Cited

U.S. PATENT DOCUMENTS

2007/0059015 A1 3/2007 Sakita et al.  
2008/0030750 A1* 2/2008 Kato ...................... G06Q 30/04  
358/1.4

(Continued)

FOREIGN PATENT DOCUMENTS

JP 2007-078887 A 3/2007  
JP 2010-074448 A 4/2010

(Continued)

OTHER PUBLICATIONS

Zhang, Yongbin, et al. "Design of a Cloud-based Print Manufacturing Management System." 2014 International Conference on Computer, Communications and Information Technology (CCIT 2014). Atlantis Press, 2014. (Year: 2014).*

(Continued)

*Primary Examiner* — Emmett K. Walsh  
(74) *Attorney, Agent, or Firm* — Merchant & Gould P.C.

(57) ABSTRACT

A printing system includes: a printing device; and a data processing server. A first controller of the printing device is configured to perform: a reading process to read a reading target to generate image data; and a data transmission process to transmit the image data to the data processing server. A second controller of the data processing server is configured to perform: a data receiving process to receive the image data; a fee calculation process to calculate a fee to be charged for forming an image based on the image data; and a payment-related process related to a payment of the (Continued)

fee. The first controller is configured to further perform: an acquisition process to acquire print data corresponding to the image data after the payment of the fee is completed; and a printing process to form the image corresponding to the print data on a printing medium.

17 Claims, 8 Drawing Sheets

(56) References Cited

U.S. PATENT DOCUMENTS

| | | | | |
|---|---|---|---|---|
| 2010/0312721 | A1* | 12/2010 | Terada | ................... G07F 17/266 |
| | | | | 705/400 |
| 2018/0082097 | A1* | 3/2018 | Sun | ........................ H04N 1/346 |
| 2018/0082270 | A1 | 3/2018 | Sun et al. | |

FOREIGN PATENT DOCUMENTS

| | | | |
|---|---|---|---|
| JP | 2013-152368 | A | 8/2013 |
| JP | 2018-046492 | A | 3/2018 |

OTHER PUBLICATIONS

International Search Report (with English translation) and Written Opinion, International Application No. PCT/JP2021/010550, dated Jun. 8, 2021 (10 pages).
English translation of the International Preliminary Report on Patentability (Chapter I) dated Sep. 29, 2022 (Application No. PCT/JP2021/010550).
Office Action issued in corresponding Japanese application No. 2020-063866, Apr. 5, 2024.

* cited by examiner

FIG. 3

P1 ──────────────────────────────────────────────────► P2

A1 ──────────────────────────────────────────────────► A2

B1

S45 — READ ONE PAGE OF ORIGINAL DOCUMENT

S47 — SAVE SCAN DATA

S49 — F=1?
NO / YES

S51 — ASSOCIATE JOB ID WITH SCAN DATA

S53 — TRANSMIT SCAN DATA

S55 — DELETE SCAN DATA

S57 — READING PROCESS HAS BEEN COMPLETED?
NO / YES

S69 — F=1?
NO / YES

S71 — CALCULATE COVERAGE

S73 — TRANSMIT COVERAGE

JOB ID
COVERAGE

B2

C1

S59 — F=1?
NO / YES

S61 — RECEIVE SCAN DATA

S63 — ALL SCAN DATA HAS BEEN RECEIVED?
NO / YES

S65 — STORE SCAN DATA IN ASSOCIATION WITH JOB ID

S67 — CALCULATE COVERAGE

S75 — RECEIVE COVERAGE

SCAN DATA
JOB ID

| A4-SIZE | | MONOCHROME [YEN/PAGE] | COLOR [YEN/PAGE] |
|---|---|---|---|
| COVERAGE X[%] | T1≦X | 15 | 75 |
| | T2<X<T1 | 10 | 50 |
| | X≦T2 | 5 | 25 |

FIG. 6B

| A3-SIZE | | MONOCHROME [YEN/PAGE] | COLOR [YEN/PAGE] |
|---|---|---|---|
| COVERAGE X[%] | T1≦X | 30 | 150 |
| | T2<X<T1 | 20 | 100 |
| | X≦T2 | 10 | 50 |

PRINTING SYSTEM INCLUDING PRINTING DEVICE GENERATING IMAGE DATA AND DATA PROCESSING SERVER CALCULATING FEE TO BE CHARGED FOR FORMING IMAGE BASED ON THE IMAGE DATA

REFERENCE TO RELATED APPLICATIONS

This application is a by-pass continuation application of International Application No. PCT/JP2021/010550 filed on Mar. 16, 2021 claiming priority from Japanese Patent Application No. 2020-063866 filed on Mar. 31, 2020. The entire contents of the international application and the priority application are incorporated herein by reference.

BACKGROUND ART

A conventional job execution system for implementing a document copy service transmits job attributes of an original document being copied to a computer, and the computer calculates the fee for the copy service based on these job attributes.

DESCRIPTION

With the conventional job execution system described above, the fee is calculated based on rough job attributes such as the number of pages being printed, the number of copies being printed, whether copying is double-sided or single-sided, whether copying is monochrome or color, and the like. Consequently, since the system does not set precise fees based on the results of reading an original document, the system is not sufficiently user-friendly.

In view of the foregoing, it is an object of the present disclosure to provide a printing system and a printing device capable of implementing a more user-friendly service for setting a fee based on the results of reading an original document.

In order to attain the above and other object, according to one aspect, the present disclosure provides a printing system including: a printing device; and a data processing server. The printing device includes: a reader; a printer; and a first controller. The reader is configured to read a reading target. The printer is configured to form an image on a printing medium. The data processing server includes a second controller. The first controller is configured to perform: a reading process; and a data transmission process. The reading process reads a reading target with the reader to generate image data corresponding to the reading target. The data transmission process transmits the image data read in the reading process to the data processing server. The second controller is configured to perform: a data receiving process; a fee calculation process; and a payment-related process. The data receiving process receives the image data transmitted in the data transmission process. The fee calculation process calculates a fee to be charged for forming an image on the printing medium based on the image data received in the data receiving process. The payment-related process is related to a payment of the fee calculated in the fee calculation process. The first controller is configured to further perform: an acquisition process; and a printing process. The acquisition process acquires print data corresponding to the image data after the payment of the fee is completed. The printing process forms the image corresponding to the print data acquired in the acquisition process on the printing medium with the printer.

According to the configuration described above, the data processing server calculates the fee to be charged for the printing device to form an image on a printing medium based on image data received from the printing device. Accordingly, the printing system can provide a user-friendly service that can set precise fees based on results of reading a reading target.

According to another aspect, the present disclosure also provides a printing device including: a reader; a printer; and a controller. The reader is configured to read a reading target. The printer is configured to form an image on a printing medium. The controller is configured to perform: a reading process; a data transmission process; an acquisition process; and a printing process. The reading process reads a reading target with the reader to generate image data corresponding to the reading target. The data transmission process transmits the image data read in the reading process to a data processing server. The acquisition process acquires print data corresponding to the image data in response to a payment of a fee to be charged for forming an image on the printing medium based on the image data transmitted in the data transmission process being completed after the data processing server calculates the fee. The printing process forms the image corresponding to the print data acquired in the acquisition process on the printing medium with the printer.

FIG. 3 is a sequence diagram illustrating steps in the process executed on the terminal, the multifunction peripheral, the data processing server, and the transaction server included in the printing system.

FIG. 6A is an explanatory diagram illustrating one example of a fee table used for calculating fees.

FIG. 6B is an explanatory diagram illustrating another example of a fee table used for calculating fees.

Figure 1:
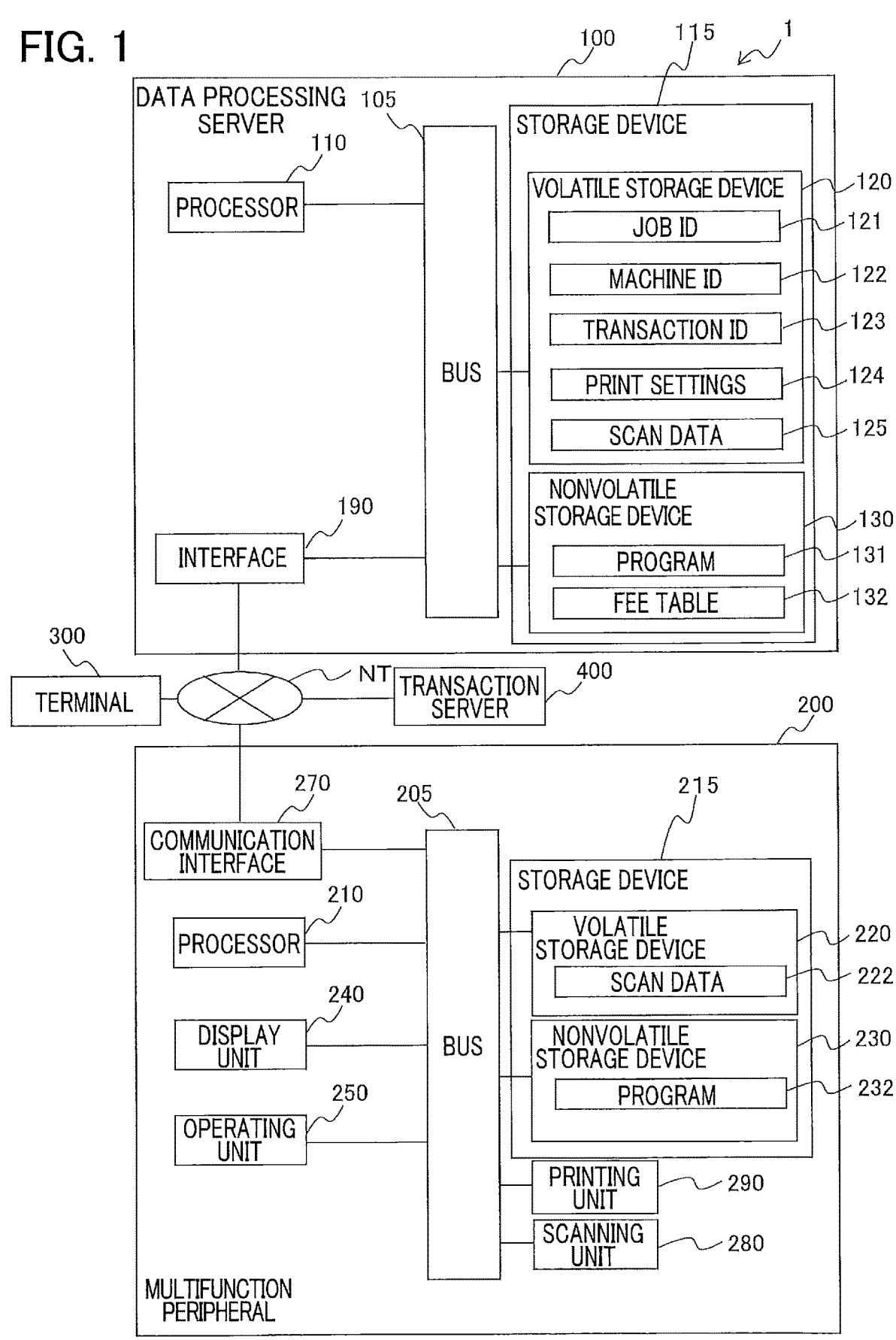
FIG. 1 is a functional block diagram illustrating the schematic overall configuration of a printing system according to one embodiment of the present disclosure.

Hereinafter, one embodiment of the present disclosure will be described while referring to the accompanying drawings. FIG. 1 shows a printing system according to the embodiment of the present disclosure. In the present embodiment, a printing system 1 provides a copy service to users, i.e., customers who pay a fee to use the copy function of a multifunction peripheral 200.

<Overview of the Printing System>

The printing system 1 in FIG. 1 includes a data processing server 100, multifunction peripheral 200, a terminal 300, and a transaction server 400. The data processing server 100, multifunction peripheral 200, terminal 300, and transaction server 400 are interconnected over a network NT and are capable of communicating with each other.

<Data Processing Server>

The data processing server 100 is installed and managed by the manufacturer of the multifunction peripheral 200, for example. The data processing server 100 has a processor 110, a storage device 115, and an interface 190. The processor 110, storage device 115, and interface 190 are interconnected via a bus 105. The processor is an example of the second controller of the present disclosure.

The storage device 115 is provided with a volatile storage device 120, and a nonvolatile storage device 130. The volatile storage device 120 is DRAM, for example, and has a job ID storage area 121, a machine ID storage area 122, a transaction ID storage area 123, a print settings storage area 124, and a scan data storage area 125. The scan data storage area is an example of the second memory of the present disclosure. The nonvolatile storage device 130 is a hard disk drive or a solid state drive, for example. The nonvolatile storage device 130 has a program storage area 131, and a fee table storage area 132. The fee table storage area 132 is an example of the first memory of the present disclosure. The storage content of these storage devices will be described later in detail.

The processor 110 is a device that performs data processing, such as a CPU. By executing a program stored in the program storage area 131, the processor 110 implements various processes, such as those in FIGS. 2, 3, 4, 5, 8, and the like described later, including processes for performing data communications with the terminal 300, multifunction peripheral 200, and transaction server 400 connected to the network NT.

The interface 190 is a wired LAN interface or a wireless interface for communicating with other devices. The interface 190 is connected to the network NT.

<Transaction Server>

The transaction server 400 is installed at a company providing various online services for settling online payments, for example. Although not shown in the drawings, the transaction server 400 has a processor, a storage device, and an interface for connecting to the network NT.

<Multifunction Peripheral>

The multifunction peripheral 200 is owned by the company providing the copy service described above, for example. The multifunction peripheral 200 has a scanning unit 280, a printing unit 290, a processor 210, a storage device 215, a display unit 240, a user-operable operating unit 250, and a communication interface 270. The processor 210 is an example of the first controller of the present disclosure. The scanning unit 280, printing unit 290, processor 210, storage device 215, display unit 240, operating unit 250, and communication interface 270 are interconnected via a bus 205.

The storage device 215 includes a volatile storage device 220, and a nonvolatile storage device 230. The volatile storage device 220 is DRAM, for example. The volatile storage device 220 is provided with a scan data storage area 222 for storing scan data. The nonvolatile storage device 230 is flash memory, for example. The nonvolatile storage device 230 is provided with a program storage area 232. Programs stored in the program storage area 232 are pre-stored in the nonvolatile storage device 230 as firmware, for example.

The processor 210 is a device such as a CPU that performs data processing. By executing a program stored in the program storage area 232, the processor 210 implements a copy function (described later in greater detail) for controlling the printing unit 290 to print images based on scan data generated when the scanning unit 280 reads an original document.

The display unit 240 is a liquid crystal display, for example. The operating unit 250 is a device that receives user operations. By operating the operating unit 250, the user can input various instructions into the multifunction peripheral 200. The communication interface 270 is a wired or wireless network interface for communicating with other devices. The communication interface 270 is connected to the network NT.

The scanning unit 280 optically reads an original document or other reading target using photoelectric conversion elements, such as a CCD or CMOS, and generates scan data representing an image of the reading target. The scanning unit 280 is an example of the reader of the present disclosure, and the scan data is an example of the image data of the present disclosure. Note that the scan data may simply be the image data produced when the scanning unit 280 reads the reading target or may be data produced by subjecting this image data to image processing or converting the data to print data.

The printing unit 290 prints images on paper according to a prescribed method, such as the laser method or inkjet method. The paper is an example of the printing medium of the present disclosure.

<Terminal>

The terminal 300 is a smartphone possessed by the user in this example. The terminal 300 connects to the network NT through wireless communication. While not shown in the drawings, the terminal 300 has a processor, a storage device, and an interface for connecting to the network NT. As an alternative, another information terminal, such as a personal computer or a tablet computer, may be used as the terminal 300.

Features of the Embodiment

On the printing system 1 having the above configuration, the features of the present embodiment are the method of processing scan data and the method of calculating the cost of the copy service when the user performs an operation to copy an original document. These features will be described at length below.

<Process Flow>

Control procedures executed by the processor 210 of the multifunction peripheral 200, the processor 110 of the data processing server 100, the processor of the transaction server 400, and the processor of the terminal 300 will be described with reference to FIGS. 2 through 8 as an example for implementing the above methods in the present embodiment. Note that references to these processors have been omitted in the following description of FIGS. 2 through 8. That is, expressions such as "the processor 210 of the multifunction peripheral 200," "by the processor 210 of the multifunction peripheral 200," and the like are simply expressed as "the multifunction peripheral 200," "by the multifunction peripheral 200," and the like.

<Accepting and Transmitting/Receiving Print Settings>

Figure 2:
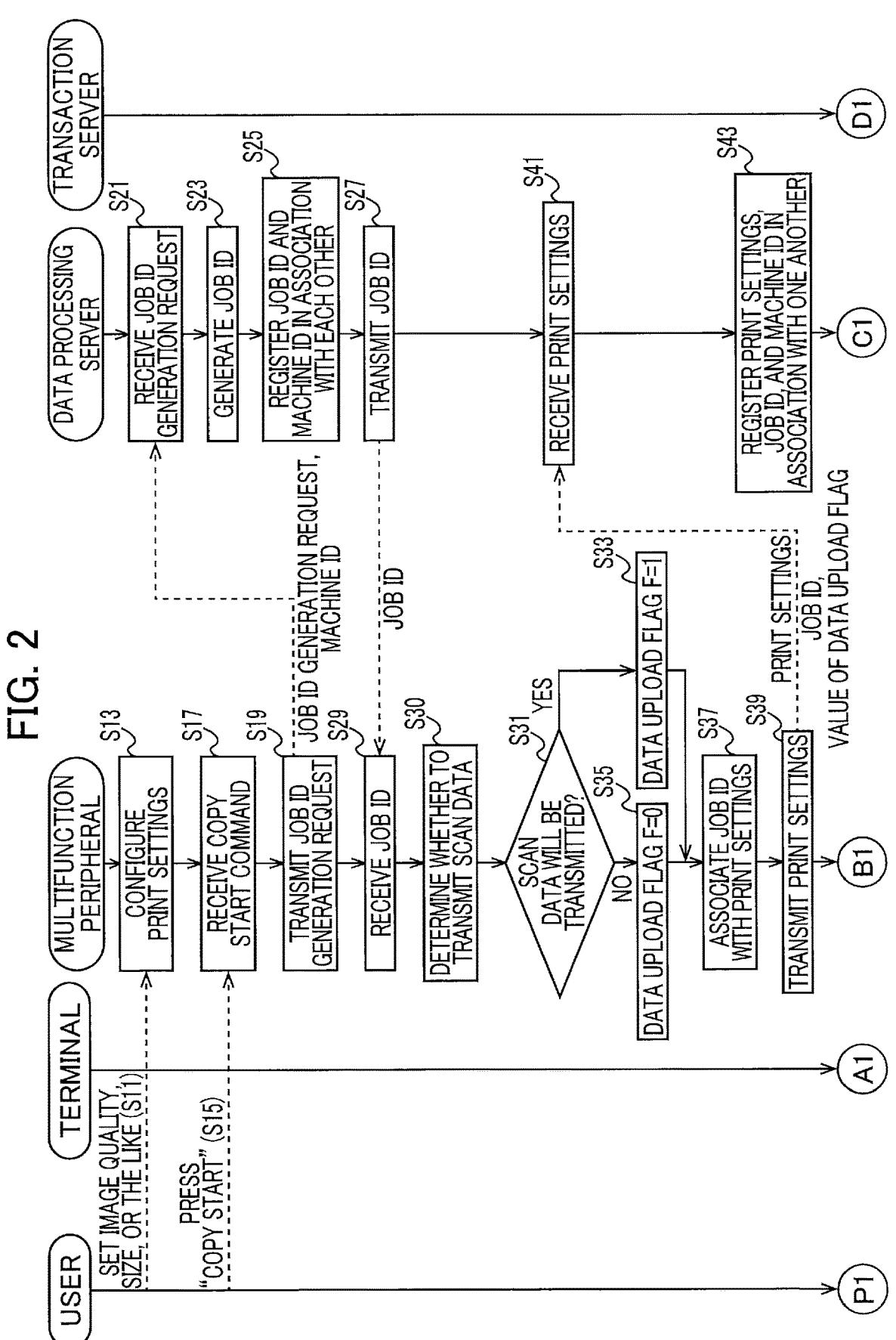
FIG. 2 is a sequence diagram illustrating steps in a process executed on a terminal, a multifunction peripheral, a data processing server, and a transaction server included in the printing system.

After setting the original document in the multifunction peripheral 200, in S11 of FIG. 2 the user inputs desired print settings through operations on the operating unit 250. These print settings include at least one of the following examples: a reading color setting indicating whether the scanning unit 280 is to read in color or monochrome; a specification for the reading resolution or printing resolution corresponding to the desired image quality when printing a scanned image of the read original document (hereinafter also called "specified resolution"); the size of the paper being printed (hereinafter also called "print paper size"); the print layout such as whether to print the same image a plurality of times on one page; a selection for single-sided or double-sided printing; and the number of pages being printed. Note that rather than inputting values for each of these print settings, the user may select an "automatic image quality setting" mode through an operation on the operating unit 250. In this mode, the multifunction peripheral 200 automatically sets a value for each print setting. In S13 the multifunction peripheral 200 accepts input for these print settings and configures the print settings based on the accepted content. The process in S13 is an example of the first accepting process of the present disclosure. When the user subsequently issues a command in S15 to begin copying (copy start command) by pressing the "COPY START" button on the operating unit 250, in S17 the multifunction peripheral 200 receives this copy start command.

In response to receiving the copy start command, in S19 the multifunction peripheral 200 transmits a request to the data processing server 100 to generate a job ID (hereinafter also called "job ID generation request"). A job ID is information for identifying the scan data, i.e., information for identifying the current copy job being executed by the multifunction peripheral 200. The job ID generation request is a request for the data processing server 100 to generate and transmit a job ID. Note that the multifunction peripheral 200 also includes a machine ID for identifying the multifunction peripheral 200 when transmitting the job ID generation request. The machine ID is an example of the device identification information of the present disclosure, and the job ID is an example of the data identification information of the present disclosure. Further, the process in S19 is an example of the device identification information transmission process of the present disclosure.

In S21 the data processing server 100 receives the job ID generation request together with the machine ID and in S23 generates a new job ID based on this information. In S25 the data processing server 100 stores and registers the generated job ID and the machine ID received in S21 in association with each other in the job ID storage area 121 and the machine ID storage area 122, respectively. Subsequently in S27 the data processing server 100 transmits the newly registered job ID to the multifunction peripheral 200 and in S29 the multifunction peripheral 200 receives the job ID. The process in S25 is an example of the storing process of the present disclosure.

After receiving a job ID in S29, in S30 the multifunction peripheral 200 determines whether to transmit or not transmit scan data generated when a read is performed in S45 described below to the data processing server 100. This determination is made according to at least one of the following: information related to the amount of available memory space currently available in the storage device 215, and specifically in the scan data storage area 222 of the volatile storage device 220 (hereinafter simply called the "available memory space"); and information related to the amount of predicted memory space that is estimated to be needed for storing the scan data (hereinafter simply called the "predicted memory requirement"). The following are some sample methods that may be used to make this determination.

(A) Determination Based on Available Memory Space

According to this method, the multifunction peripheral 200 determines whether to transmit or not transmit scan data based on the available memory space described above.

Specifically, the multifunction peripheral 200 compares the current available memory space to a predetermined threshold. If the available memory space is greater than or equal to the threshold, the multifunction peripheral 200 considers the scan data storage area 222 to have sufficient capacity remaining to store the scan data. As a result, the multifunction peripheral 200 determines that scan data will not be transmitted to the data processing server 100. Conversely, if the available memory space is less than the threshold, the multifunction peripheral 200 considers that the scan data storage area 222 does not have sufficient capacity remaining to store the scan data and determines that the scan data will be transmitted to the data processing server 100.

The value of the threshold used in this method may be variably set according to various information related to the predicted memory requirement described above. Specifically, this related information (hereinafter also called "capacity-related information" described below) includes at least one of the following: a document scanning mode indicating whether the original document is placed in an automatic document feeder (ADF) or on a flatbed; the reading color setting for the scanning unit 280; the specified resolution specified by the user; the print paper size; and the like set in S11 described above.

Note that other information related to the available memory space may be acquired and used according to suitable methods. Examples of such information are information indicating whether at least a portion of the storage device 215 has been appropriated to other users, and information indicating whether a function other than the copy function is being executed on the multifunction peripheral 200. The information related to the available memory space is also called "available capacity information."

(B) Determination Based on Predicted Memory Requirement

In this method, the multifunction peripheral 200 determines whether to transmit or not transmit scan data based on information related to the predicted memory requirement described above as the capacity-related information, such as the document scanning mode, the reading color setting, the specified resolution, and the print paper size. Specifically, the predicted memory requirement indicating the memory space required for storing the scan data is considered to be relatively small when the original document is placed on the flatbed of the multifunction peripheral 200, when the reading color setting is monochrome, when the specified resolution is a relatively small value, and when the print paper size is relatively small. As a result, the multifunction peripheral 200 determines that scan data will not be transmitted to the data processing server 100. Conversely, the multifunction peripheral 200 considers the predicted memory requirement for storing the scan data is large when the document is placed in the ADF of the multifunction peripheral 200, when the reading color setting is color, when the specified resolution is a relatively large value, and when the print paper size is relatively large. As a result, the multifunction peripheral 200 determines that scan data will be transmitted to the data processing server 100. The multifunction peripheral 200 may use either the determination based on available memory space (the determination based on available capacity information) or the determination based on predicted memory requirement (the determination based on capacity-related information) to determine whether to transmit or not transmit scan data to the data processing server 100, or may execute both determinations.

After the multifunction peripheral 200 has determined in S30 whether to transmit or not transmit the scan data to the data processing server 100 as described above, in S31 the multifunction peripheral 200 determines whether the determination has been made to transmit the scan data. The multifunction peripheral 200 sets a data upload flag F to 1 in S33 when the determination is made to transmit the scan data (S31: YES), and sets the data upload flag F to 0 in S35 when the determination is made to not transmit the scan data (S31: NO). Subsequently, the process advances to S37.

Here, the multifunction peripheral 200 may be configured to always transmit scan data to the data processing server 100 regardless of the determination in S31 described above when the scan data storage area 222 of the multifunction peripheral 200 has a considerably small memory capacity, when particular importance has been placed on making fee revisions described later more expedient, and in other cases. In such cases, steps S30, S31, S33, and S35 are omitted from the above process and, in the remaining process, the multifunction peripheral 200 only executes steps corresponding to the case in which the data upload flag F is 1, while steps corresponding to the case in which the data upload flag F is 0, the determination as to whether the data upload flag F is 1, the setting of the data upload flag F, the transmission of the value of the data upload flag F to the data processing server 100 and the like are omitted.

In S37 the multifunction peripheral 200 associates the job ID received in S29 with the print settings described above, including the reading color setting, specified resolution, print paper size, print layout, and selection for single-sided or double-sided printing, and in S39 transmits the print settings to the data processing server 100. The print settings and job ID transmitted at this time are also associated with the value of the data upload flag F that has been set in S35 or S33. The process in S39 is an example of the first setting transmission process of the present disclosure.

In S41 the data processing server 100 receives the print settings transmitted from the multifunction peripheral 200 together with the job ID and the value of the data upload flag F. The process in S41 is an example of the first setting receiving process of the present disclosure. In S43 the data processing server 100 stores and registers the print settings and job ID received in S41 and the machine ID received in S21 in the corresponding print settings storage area 124, job ID storage area 121, and machine ID storage area 122 of the volatile storage device 120 in a manner associated with one another.

Note that the determination in S30 of whether to transmit or not transmit the scan data and the subsequent processes in S31, S33, and S35 may be executed at a timing between steps S17 and S19. When subsequently executing S19 in this case, the multifunction peripheral 200 can transmit the content described in S39, i.e., the print settings and the value of the data upload flag F, together with the job ID generation request and machine ID. Consequently, in addition to receiving the job ID generation request and machine ID in S21, the data processing server 100 can also receive the content described in S41, which includes the print settings and the value of the data upload flag F. Thus, after generating a job ID in S23, in S25 the data processing server 100 can register the content described in S43, and specifically the print settings, job ID, and machine ID, in association with one another.

<Original Document Reading and Coverage Calculation>

After completing the process in S39 described above, the multifunction peripheral 200 advances to S45 in FIG. 3 and reads one page of the original document set in the multifunction peripheral 200. The process in S45 is an example of the reading process of the present disclosure. In S47 the multifunction peripheral 200 saves the scan data for the read page in the scan data storage area 222 of the volatile storage device 220. Subsequently in S49 the multifunction peripheral 200 determines whether the data upload flag F described above is set to 1, i.e., whether the determination has been made to transmit the scan data. The multifunction peripheral 200 advances to S57 described below when reaching a NO determination (S49: NO), and continues on to S51 when reaching a YES determination (S49: YES).

In S51 the multifunction peripheral 200 associates the job ID received in S29 with the scan data that has been saved in the scan data storage area 222 in S47, and in S53 transmits this scan data and job ID to the data processing server 100. The process in S53 is an example of the data transmission process of the present disclosure. In S55 the multifunction peripheral 200 deletes the scan data from the scan data storage area 222. In the subsequent process of S57, the multifunction peripheral 200 determines whether the reading process has been completed for all pages of the original document the user wishes to copy and repeats steps S45 through S55 when determining that the reading process has not been completed (S57: NO). When the reading process has been completed for all pages of the original document that the user wishes to copy (S57: YES), the process advances to S69 described below.

The present disclosure is not limited to the above method of transmitting scan data for one page to the data processing server 100 in S53 after each page has been read in S45. That is, the multifunction peripheral 200 may sequentially store scan data in the scan data storage area 222 for a plurality of scanned pages and may begin transmitting the scan data to the data processing server 100 when the available memory space in the scan data storage area 222 falls below a prescribed value.

Alternatively, the scan data storage area 222 may be provided with a first area and a second area into which scan data can be inputted. With this arrangement, the multifunction peripheral 200 begins by sequentially inputting scan data for each read page into the first area of the scan data storage area 222. Once the remaining memory space in the first area drops below the prescribed value, the multifunction peripheral 200 switches the input destination for scan data to the second area and begins inputting scan data for each page into the second area after each page is read while also transmitting this inputted scan data directly to the data processing server 100 and subsequently deleting this transmitted scan data from the second area of the scan data storage area 222.

In the meantime, after completing the process of S43 described above, in S59 of FIG. 3 the data processing server 100 determines whether the data upload flag F is set to 1, i.e., whether the multifunction peripheral 200 has made the determination to transmit scan data. The data processing server 100 advances to S75 when the data upload flag F is not set to 1 (S59: NO) and continues on to S61 when the data upload flag F is set to 1 (S59: YES). In S61 the data processing server 100 receives the scan data and job ID transmitted from the multifunction peripheral 200 in S53 described above. The process in S61 is an example of the data receiving process of the present disclosure.

In S63 the data processing server 100 determines whether all scan data has been received and continues to receive data in S61 while not all scan data has been received (S63: NO). The data processing server 100 makes the determination based on a notification from the multifunction peripheral 200, for example. The scan data for the last page may include data indicating that it is the last page, and the data processing server 100 may make the determination based on this data. Once all scan data has been received (S63: YES), in S65 the data processing server 100 stores the scan data received in S61 in the scan data storage area 125 in association with the job ID generated in S23. The process in S65 is an example of the saving process of the present disclosure. In S67 the data processing server 100 calculates the coverage of the scan data and subsequently advances to S77 described below.

Further, after determining in S57 that reading has been completed (S57: YES), in S69 the multifunction peripheral 200 determines whether the data upload flag F is set to 1, i.e., whether the determination has been made to transmit scan data. The multifunction peripheral 200 advances to S87 described later when determining that the data upload flag F is not set to 1 (S69: YES) and advances to S71 when determining that the data upload flag F is set to 1 (S69: NO). In S71 the multifunction peripheral 200 calculates the coverage for the scan data that has been saved in S47 and in S73 transmits the calculated value for coverage to the data processing server 100. Subsequently, the process advances to S87 described later. In S75 the data processing server 100 receives the coverage value transmitted from the multifunction peripheral 200 and advances to S77 described below.

<Fee Calculation and Payment>

Figure 4:
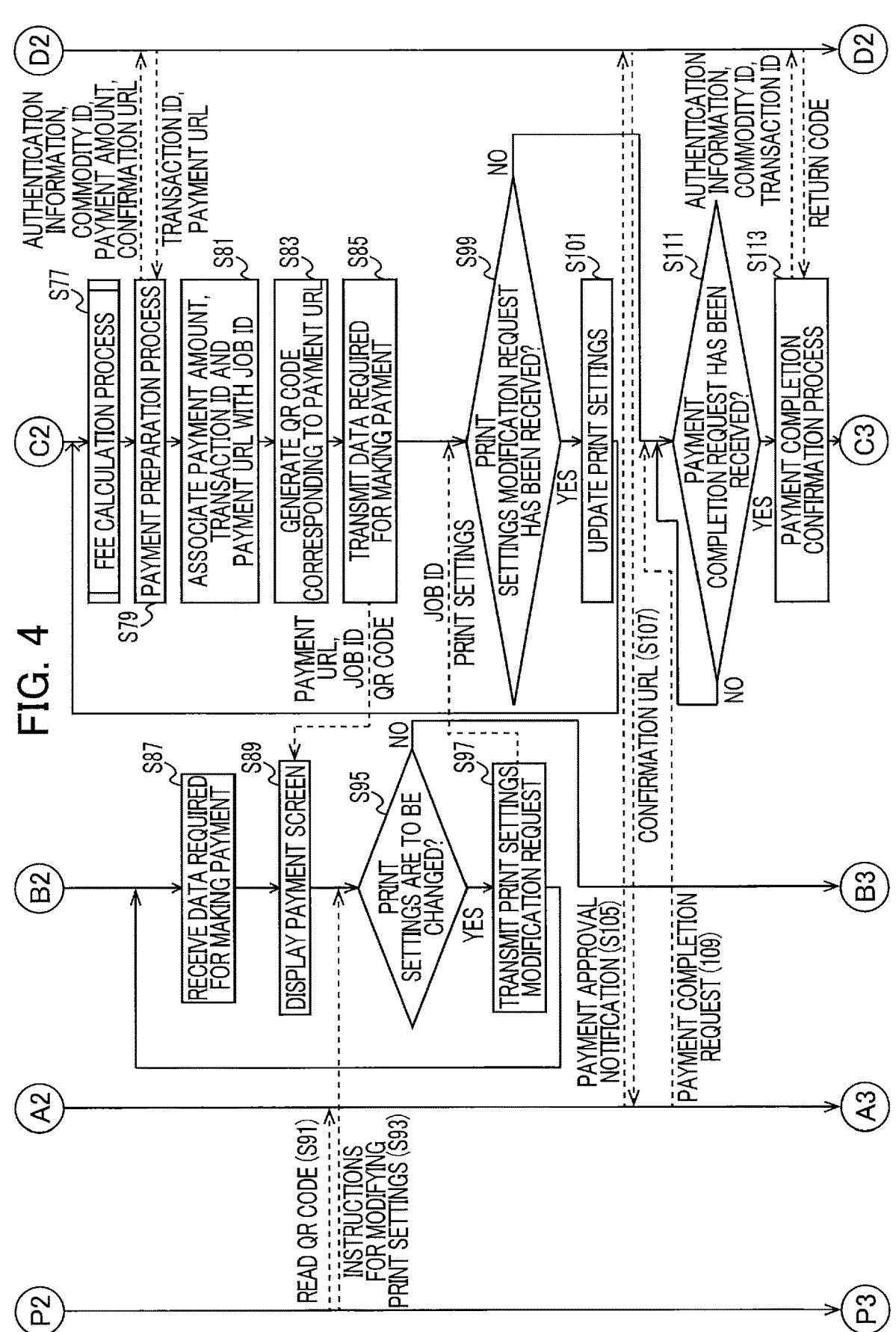
FIG. 4 is a sequence diagram illustrating steps in the process executed on the terminal, the multifunction peripheral, the data processing server, and the transaction server included in the printing system.

Continuing from FIG. 4, in S77 the data processing server 100 calculates a fee to be charged to the user for using the copy service for the current job, i.e., for reading the above original document and printing the corresponding scan data, based on the coverage value calculated in S67 described above or the coverage value received in S75. S77 is an example of the fee calculation process of the present disclosure. To calculate this fee, the data processing server 100 uses a fee table stored in the fee table storage area 132 of the volatile storage device 120 described above. The fee table associates various coverages with their corresponding fees. In addition to the level of coverage, the data processing server 100 also considers the print settings described above when calculating the fee.

The print settings include at least one of the following settings described earlier: the reading color setting indicating either color or monochrome; the specified resolution for a reading resolution or printing resolution corresponding to the print quality; the print paper size; the print layout; the selection for single-sided/double-sided printing; and the number of pages being printed. The reading color setting corresponds to whether the scan data is to be printed in color or in monochrome. This reading color setting is an example of the printing color setting of the present disclosure, and the number of pages being printed is an example of the number of pages to be printed of the present disclosure.

Note that when the "automatic image quality setting" mode has been selected in S11 described above, the data processing server 100 automatically sets at least one of the print settings based on the scan data received in S61. Thus, the data processing server 100 calculates the fee based on this automatically set content.

Figure 5:
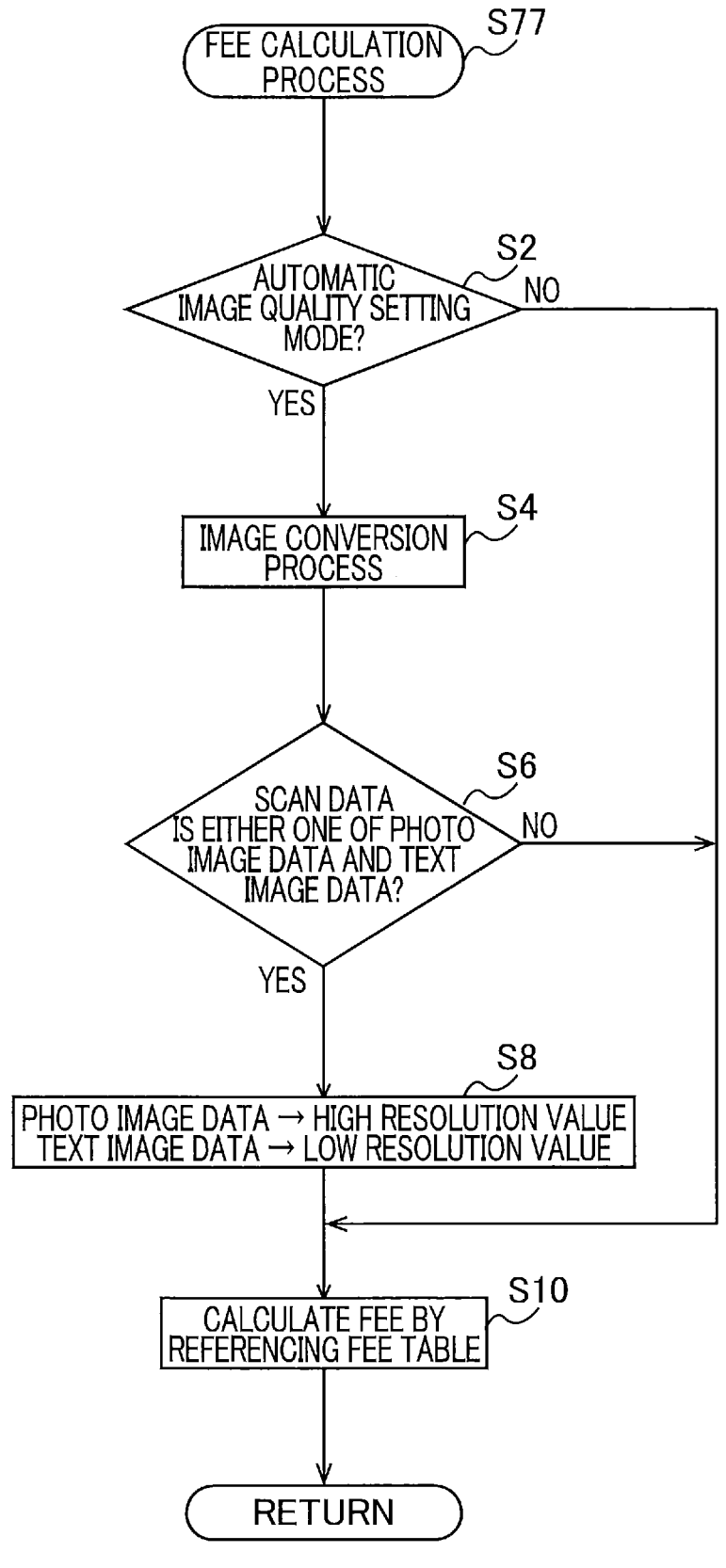
FIG. 5 is a flowchart illustrating steps in a fee calculation process executed on the data processing server in S77 of FIG. 4.
Figure 7:
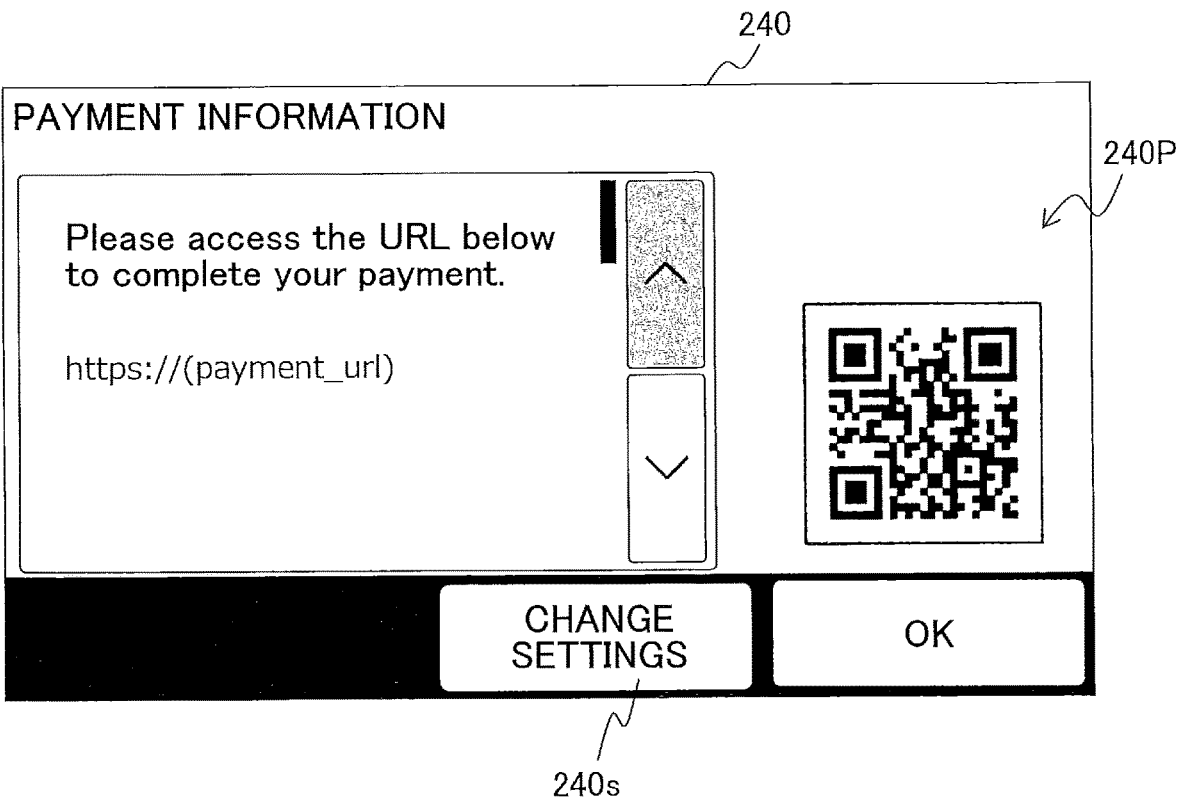
FIG. 7 is an explanatory diagram illustrating one example of a payment screen with a payment URL displayed on the terminal.

The fee calculation process executed on the data processing server 100 in S77 will be described in greater detail with reference to FIG. 5. In S2 of FIG. 5, the data processing server 100 determines based on the settings received in S41 whether the "automatic image quality setting" mode has been set on the multifunction peripheral 200 in step S13 described above. The data processing server 100 advances to S10 described below when determining that the "automatic image quality setting" mode has not been set (S2: NO) and continues on to S4 when determining that the "automatic image quality setting" mode has been set (S2: YES).

In S4 the data processing server 100 performs a well-known image conversion process on the scan data received in S61 in order to differentiate photo image data and text image data in S6 described next. Note that when the data processing server 100 has not received the scan data in S61, i.e., when the data upload flag F is 0, the data processing server 100 may not perform the image conversion process in S4. Subsequently, in S6 the data processing server 100 determines based on the scan data converted in S4 whether the scan data is either one of photo image data generated by reading an original document with photos and text image data generated by reading an original document with text. The process in S6 is an example of the image data determination process of the present disclosure. The data processing server 100 advances to S10 described later when determining that the scan data is neither photo image data nor text image data (S6: NO) and advances to S8 when determining that the scan data is either photo image data or text image data.

In S8 the data processing server 100 automatically sets a print setting for the scan data based on the type of image data determined in S6. In this example, the data processing server 100 sets the printing resolution to a prescribed high resolution value when the scan data has been determined to be photo image data and to a low resolution value when the scan data has been determined to be text image data. The process in S8 is an example of the setting process of the present disclosure.

In S10 the data processing server 100 sets the fee for the coverage value calculated in S67 or the coverage value received in S75 by referencing the fee table based on at least one of the print settings received in S41 and the content automatically set in S8. In this example, the data processing server 100 takes into account two of the above print settings for this fee calculation: the reading color setting indicating color or monochrome; and the print paper size. However, other print settings may be considered when calculating fees.

FIG. 6A shows a sample fee table used for calculating fees. This example shows a case in which the print paper size is A4-size. Further, three coverage ranges are established for a coverage X of scan data using prescribed threshold values T1 and T2 (where T2<T1): the coverage range in which $T1 \le X$; the coverage range in which $T2 < X < T1$; and the coverage range in which $X \le T2$. The fee table associates these three coverage ranges with a corresponding fee for each range.

In this example, the cost per page for monochrome printing is set to 15 yen when the coverage X is in the range $T1 \le X$, 10 yen when the coverage X is in the range $T2 < X < T1$, and 5 yen when the coverage X is in the range $X \le T2$. In other words, a base rate is used as the fee when the coverage X is in the range $T2 < X < T1$, and a surcharge of 5 yen per page is added to this base rate for larger coverages while a discount of 5 yen per page is subtracted from the base rate for smaller coverages.

Similarly, the cost per page for color printing is set to 75 yen when the coverage X is in the range $T1 \le X$, 50 yen when the coverage X is in the range $T2 < X < T1$, and 25 yen when the coverage X is in the range $X \le T2$. In this case, a base rate is used as the fee when the coverage X is in the range $T2 < X < T1$, and a surcharge of 25 yen per page is added to this base rate for larger coverages while a discount of 25 yen per page is subtracted from the base rate for smaller coverages.

FIG. 6B shows another sample fee table used for calculating fees. This example shows a case in which the print paper size is A3-size. In this case, the cost per page for monochrome printing is 30 yen when the coverage X is in the range T1≤X, 20 yen when the coverage X is in the range T2<X<T1, and 10 yen when the coverage X is in the range X≤T2. That is, a base rate is charged when the coverage X is in the range T2<X<T1, and a surcharge of 10 yen per page is added to this base rate for larger coverages while a discount of 10 yen per page is subtracted from the base rate for smaller coverages.

Similarly, the cost per page for color printing is 150 yen when the coverage X is in the range T1≤X, 100 yen when the coverage X is in the range T2<X<T1, and 50 yen when the coverage X is in the range X≤T2. In this case, a base rate is charged for coverages X in the range T2<X<T1, and a surcharge of 50 yen per page is added to this base rate for larger coverages while a discount of 50 yen per page is subtracted from the base rate for smaller coverages.

The above description offers one example, but the settings of the base rate and the corresponding surcharges and discounts may be modified as needed.

The routine in FIG. 5 ends once the data processing server 100 has calculated the fee corresponding to the scan data based on the coverage and print settings, and the process subsequently advances to S79 in FIG. 4.

In S79 the data processing server 100 performs a payment preparation process. Specifically, the data processing server 100 transmits a commodity ID appropriately issued for the execution of the current copy service, a payment amount obtained through the calculation in S77, authentication information to be used for authentication on the transaction server 400, and a confirmation URL for confirming the completion of payment (the URL of the data processing server 100 in the present embodiment) to the transaction server 400. In response to this transmission, the data processing server 100 also receives a payment URL that the user accesses to pay the fee, and a transaction ID related to the fee payment procedure from the transaction server 400.

Next, in S81 the data processing server 100 associates the payment amount resulting from the calculation in S77 and the transaction ID and payment URL acquired in S79 with the job ID described above. In S83 the data processing server 100 generates a barcode, that is a QR code (registered trademark) in the present embodiment, corresponding to the payment URL according to a suitable method known in the art, and in S85 transmits data required for making a payment, including the QR code, to the multifunction peripheral 200. "QR code" is a Japanese registered trademark of DENSO WAVE INCORPORATED. At this point, the scan data associated with the QR code and job ID remains saved in the scan data storage area 125, as described above. The payment URL and QR code are examples of the payment information of the present disclosure. The payment URL and QR code are also examples of the fee-related information of the present disclosure. The process in S85 is an example of the payment information transmission process of the present disclosure. The process in S85 is also an example of the fee-related information transmission process of the present disclosure.

In addition to the QR code, the data required for making a payment includes the payment URL and job ID described above. The multifunction peripheral 200 receives this data in S87. The process in S87 is an example of the payment information receiving process of the present disclosure. The process in S87 is also an example of the fee-related information receiving process of the present disclosure. After receiving this data, in S89 the multifunction peripheral 200 displays a prescribed payment screen 240P on the display unit 240 showing the above data required for payment that includes at least the QR code. That is, the process in S89 is an example of the displaying process of the present disclosure. Instead of outputting this data required for payment to the display unit 240, in other words, instead of displaying this data required for payment on the display unit 240, the multifunction peripheral 200 may instead print out the data on paper using the printing unit 290. In S91 the user reads the QR code displayed in the payment screen 240P with a scanner or camera provided in the terminal 300, whereby a screen with the payment URL is displayed on the terminal 300. By accessing the payment URL displayed in this screen, the user can display a fee display screen that includes the fee calculated above and the like on the terminal 300. Through this display, the user can learn the fee that the user must pay to use the copy service for this case.

Thereafter, in S95 the multifunction peripheral 200 determines whether the user has inputted instructions to modify print settings. That is, if the user, after seeing the fee displayed on the display unit 240 in S89 described above, decides to reconsider the charges, for example, in S93 the user may operate a Change Settings key 240s in the payment screen 240P shown in FIG. 7 and perform appropriate operations on the operating unit 250 to input instructions for modifying the print settings. The multifunction peripheral 200 receives these modified print settings and, as a result, advances to S97 after determining in S95 that the print settings are to be changed (S95: YES). The process to receive the modified print settings is an example of the second accepting process of the present disclosure.

In S97 the multifunction peripheral 200 transmits a print settings modification request specifying the content of print settings changed by the user to the data processing server 100 together with the job ID. The process in S97 is an example of the second setting transmission process of the present disclosure. The data processing server 100 then receives this request. This process is an example of the second setting receiving process of the present disclosure. Thus, in S99 the data processing server 100 determines that a print settings modification request has been received (S99: YES) and advances to S101. In S101 the data processing server 100 modifies the current print settings based on the content in the print settings modification request received from the multifunction peripheral 200 and updates the stored print settings. Based on the updated content of print settings, in S77 the data processing server 100 recalculates the fee for the scan data saved in the scan data storage area 125 that corresponds to the received job ID. This process in S77 is an example of the recalculation process of the present disclosure. Consequently, the processes in S79, S81, S83, and S85 described above are repeated for the recalculated fee. In S87 the multifunction peripheral 200 receives the QR code, payment URL, and job ID from the data processing server 100 and in S89 redisplays the payment screen 240P. Thus, the user can learn the recalculated fee in the same manner described above.

On the other hand, if the user does not feel the need to review the fee and does not input instructions to modify print settings but rather accepts the charges for the current content (S95: NO), the process advances to S117 described later. Further, if the user does not input instructions to modify print settings so that a print settings modification request is not transmitted to the data processing server 100 (S99: NO), the process advances to S111 described later. To accept the print settings at the displayed fee, the user performs a suitable operation in the fee display screen displayed on the terminal 300 to transmit a payment approval notification to the transaction server 400 in S105 indicating that the user agrees to pay the fee for the current copy service, i.e., indicating that the user approves of paying the aforementioned fee for scanning the original document and printing the corresponding scan data.

After receiving the payment approval notification, in S107 the transaction server 400 transmits the confirmation URL to the terminal 300 that corresponds to the payment URL sent to the data processing server 100 in S79 during payment preparation process. Based on this confirmation URL, in S109 the terminal 300 transmits a payment completion request to the data processing server 100, and the data processing server 100 receives this payment completion request. In the meantime, the data processing server 100 repeatedly performs the determination in S111 while a payment completion request has not been received (S111: NO). When the data processing server 100 determines that a payment completion request has been received (S111: YES), in S113 the data processing server 100 performs a payment completion confirmation process to confirm payment completion. Specifically, the data processing server 100 transmits the authentication information, commodity ID, and transaction ID corresponding to the confirmation URL to the transaction server 400. Subsequently, the data processing server 100 receives a return code from the transaction server 400 in response. The process in S113 is an example of the completion determination process of the present disclosure.

<Scan Data and Printing>

Figure 8:
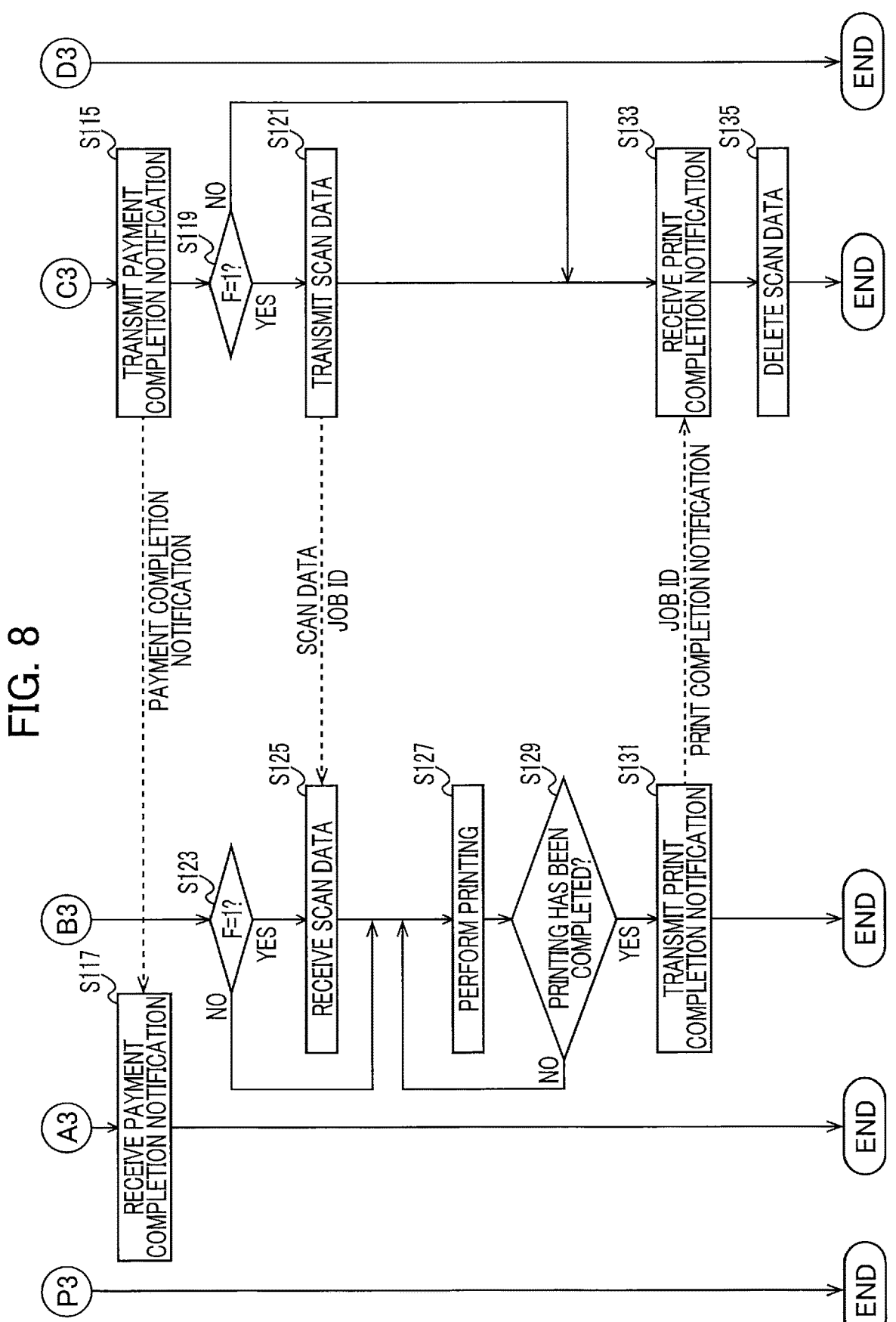
FIG. 8 is a sequence diagram illustrating steps in the process executed on the terminal, the multifunction peripheral, the data processing server, and the transaction server included in the printing system.

After the data processing server 100 performs the payment completion process in S113 to confirm the completion of payment, in S115 of FIG. 8 the data processing server 100 transmits a payment completion notification to the terminal 300, and the terminal 300 receives this payment completion notification in S117. The processes in S77, S79, S81, S93, S85, S111, S113 and S115 described above are examples of the payment-related process of the present disclosure. Further, the payment completion notification is an example of the completion information of the present disclosure, and the process in S115 is an example of the completion information transmission process of the present disclosure.

Subsequently in S119, the data processing server 100 determines whether the data upload flag F is set to 1, i.e., whether the determination has been made to transmit scan data. The data processing server 100 advances to S133 described later when the data upload flag F is not set to 1 (S119: NO) and advances to S121 when the data upload flag F is set to 1 (S119: YES). In S121 the data processing server 100 transmits the scan data saved in the scan data storage area 125 as print data to the multifunction peripheral 200 together with the corresponding job ID. Note that in S121 the data processing server 100 may perform a suitable process on the scan data and transmit the processed scan data to the multifunction peripheral 200 as the print data rather than simply transmitting the scan data saved in the scan data storage area 125 as is. Hereinafter, the term "scan data" will be used to include the scan data that has undergone such processing. The process in S121 is an example of the print data transmission process of the present disclosure.

In the meantime, in S123 the multifunction peripheral 200 determines whether the data upload flag F is set to 1, i.e., whether the determination has been made to transmit scan data. The multifunction peripheral 200 advances to S127 described later when the data upload flag F is not set to 1 (S123: NO) and advances to S125 when the data upload flag F is set to 1 (S123: YES). In S125 the multifunction peripheral 200 receives and acquires the scan data and job ID transmitted from the data processing server 100 in S121 described above. The process in S125 is an example of the acquisition process of the present disclosure. The scan data acquired in S125 is an example of the print data of the present disclosure.

Note that other methods may be used in place of the method described in steps S121 and S125 for transmitting scan data directly from the data processing server 100 to the multifunction peripheral 200.

For example, in response to receiving a return code from the transaction server 400 that is a notification confirming the completion of payment, the data processing server 100 may store the scan data saved in the scan data storage area 125 in a suitable external device connected to the network NT. In this case, the data processing server 100 subsequently transmits a data acquisition instruction to the multifunction peripheral 200. The multifunction peripheral 200 receives the data acquisition instruction described above. Upon receiving the data acquisition instruction from the data processing server 100, the multifunction peripheral 200 accesses the external device through the network NT and acquires the scan data from the external device. In this case, this acquisition of the scan data is an example of the acquisition process of the present disclosure.

In S127 the multifunction peripheral 200 controls the printing unit 290 to execute printing based on the scan data received in S125 on paper according to the print settings set at the current time. The process in S127 is an example of the printing process of the present disclosure. The multifunction peripheral 200 continues printing in S127 while determining in S129 that printing is not completed (S129: NO). Once all printing based on the scan data has been completed (S129: YES), in S131 the multifunction peripheral 200 transmits a print completion notification to the data processing server 100 together with the job ID.

In S133 the data processing server 100 receives the print completion notification together with the job ID from the multifunction peripheral 200. Subsequently in S135 the data processing server 100 deletes the data saved in the volatile storage device 120 in association with the job ID received in S133. Specifically, the data processing server 100 deletes the scan data saved in the scan data storage area 125, the job ID saved in the job ID storage area 121, the machine ID saved in the machine ID storage area 122, the transaction ID saved in the transaction ID storage area 123, and the print settings saved in the print settings storage area 124. This ends the process flow described above. Note that when the scan data is not saved in the scan data storage area 125, i.e., when the data upload flag F is 0, the data processing server 100 deletes the data other than the scan data in S135.

Effects of the Embodiment

In the printing system 1 of the present embodiment described above, after reading an original document and generating corresponding scan data, the multifunction peripheral 200 transmits the scan data to the data processing server 100. After receiving scan data from the multifunction peripheral 200, the data processing server 100 calculates a fee in S77 based on the scan data. In this way, the data processing server 100 calculates a fee to be charged for forming images on paper based on the scan data. Subsequently, the data processing server 100 performs a payment-related process for settling the fee calculated above (S79).

When the multifunction peripheral 200 subsequently determines that the above payment has been completed, the multifunction peripheral 200 acquires the scan data for which the fee has been calculated, and prints images corresponding to this scan data on paper.

According to the present embodiment described above, the data processing server 100 calculates the fee to be charged for the multifunction peripheral 200 to form an image on paper based on scan data received from the multifunction peripheral 200. Accordingly, the printing system 1 can provide a user-friendly service that can set precise fees based on results of reading an original document.

Another feature of the present embodiment is that fees in the fee calculation are calculated based on the coverage of the scan data. This enables the printing system 1 to set precise fees reflecting the amount of liquid that will be consumed based on color densities in the actual image.

Another feature of the present embodiment is that correlations are stored in the fee table storage area 132 in advance to associate a plurality of coverage ranges with their corresponding fees. By referencing these correlations, the data processing server 100 can quickly and easily set a fee when calculating fees based on the coverage of the scan data. Further, if fees must be revised for any reason, such revisions can be achieved simply by revising the correlations in the fee table storage area 132.

Another feature of the present embodiment is that the data processing server 100 calculates fees based not only on the coverage of the scan data, but also on the print settings, thereby enabling the data processing server 100 to set more precise fees. In S6 of this embodiment, the data processing server 100 determines whether the scan data received from the multifunction peripheral 200 is either one of photo image data and text image data, and subsequently in S8 sets print settings based on this determination. In this way, print settings are automatically set based on the content of the scan data, eliminating the need for the user of the service to input the print settings and improving user convenience by simplifying operations.

Another feature of the present embodiment is that in the fee calculation of S77 the data processing server 100 calculates the fee according to not only the coverage of the scan data, but also the print settings. That is, when the user of the multifunction peripheral 200 inputs print settings on the operating unit 250, the multifunction peripheral 200 receives those print settings in S13 and transmits the print settings to the data processing server 100 in S39. After receiving the print settings from the multifunction peripheral 200, the data processing server 100 calculates a fee based on the print settings and the coverage of the scan data. This enables the printing system 1 to perform more detailed pricing.

Another feature of the present embodiment is that the print settings include printing color settings, the number of pages to be printed, the print paper size, and the like, enabling more detailed fee setting that takes these settings into account.

Another feature of the present embodiment is that fees can be recalculated when the user wishes based on the results of the initial fee calculation. That is, after calculating a fee, the data processing server 100 transmits corresponding fee-related information to the multifunction peripheral 200, and the multifunction peripheral 200 displays the fee based on this fee-related information.

If the user modifies print settings after viewing the fee, the multifunction peripheral 200 receives these modified print settings and transmits the modified print settings to the data processing server 100. Upon receiving the modified print settings, the data processing server 100 recalculates the fee based on the new settings.

Accordingly, when the user decides to modify print settings for any reason after viewing the fee corresponding to the initial print settings, the data processing server 100 can recalculate what the fees would be for the modified print settings. Thus, this method can improve user convenience.

Another feature of the present embodiment is that a job ID is associated with the scan data that the data processing server 100 receives in S61. The data processing server 100 uses this job ID when subsequently calculating a fee in S77. This method enables the efficient calculation of fees to be charged for scan data while maintaining a link to the scan data.

Another feature of the present embodiment is that a job ID is associated with the scan data that the data processing server 100 receives in S61. The data processing server 100 uses this job ID when subsequently transmitting fee-related information in S85. This method enables the data processing server 100 to efficiently transmit fee-related information corresponding to the fee being charged for scan data while maintaining a link to the scan data.

Another feature of the present embodiment is that a machine ID for identifying the multifunction peripheral 200 is associated with the multifunction peripheral 200 in advance. The multifunction peripheral 200 transmits this machine ID to the data processing server 100 (S19), and the data processing server 100 stores the machine ID in association with the job ID for the corresponding scan data (S25).

Thus, when the data processing server 100 transmits scan data to the multifunction peripheral 200 after payment for the scan data has been completed as described above (S121), the data processing server 100 can identify the multifunction peripheral 200 having the machine ID associated with the job ID of the scan data as the transmission destination and can reliably transmit the scan data to this multifunction peripheral 200.

Another feature of the present embodiment is that the following process is performed when recalculating fees due to print settings being changed after the fee was calculated based on initial print settings, as described above. Specifically, the data processing server 100 saves received scan data in the scan data storage area 125 in association with a unique job ID. In the meantime, the multifunction peripheral 200 associates the same job ID described above with print settings when transmitting the print settings to be used in order to print an image based on the scan data. The data processing server 100 receives the print settings and the associated job ID transmitted from the multifunction peripheral 200 and subsequently calculates the fee for saved scan data by applying the print settings having the same job ID as the scan data. Thereafter, while the scan data remains stored in the scan data storage area 125, the data processing server 100 transmits fee-related information corresponding to the fee calculation results to the multifunction peripheral 200 in association with the job ID. After receiving the fee-related information and job ID from the data processing server 100, the multifunction peripheral 200 accepts user-modified print settings from the user viewing the corresponding fee display. Subsequently, the multifunction peripheral 200 transmits the modified print settings associated with the job ID to the data processing server 100.

The data processing server 100 receives the modified print settings and corresponding job ID transmitted from the multifunction peripheral 200. In a subsequent recalculating process, the data processing server 100 recalculates the fee for the scan data that is still stored in the scan data storage area 125 by applying the modified print settings received from the multifunction peripheral 200 that are associated with the same job ID as the scan data.

As described above in the present embodiment, print settings, corresponding fee-related information, and modified print settings related to scan data are exchanged between the multifunction peripheral 200 and data processing server 100 while the scan data remains stored in the scan data storage area 125. At this time, these print settings, fee-related information, and modified print settings are associated with a job ID common to the corresponding scan data, enabling the various processes to be smoothly executed while reliably maintaining correspondence with the scan data.

Another feature of the present embodiment is that, after executing a payment-related process, the data processing server 100 transmits data necessary for making a payment that has been obtained in the payment-related process to the multifunction peripheral 200. After receiving this data, the multifunction peripheral 200 displays the data on the display unit 240. This facilitates the user of the multifunction peripheral 200 to proceed with the payment procedure on the user's own by visually confirming and using the displayed data necessary for payment. In particular, when a barcode is displayed as described above, the user of the multifunction peripheral 200 can easily proceed with the payment procedure without needing to acquire any special application program or the like, but simply by scanning the displayed barcode.

Another feature of the present embodiment is that in S113 the data processing server 100 determines whether payment has been completed based on the data necessary for payment and subsequently in S115 transmits a payment completion notification to the multifunction peripheral 200 when determining in S113 that payment has been completed. This process enables the multifunction peripheral 200 to determine reliably that payment has been completed based on the payment completion notification received from the data processing server 100 (S125).

While the invention has been described in conjunction with various example structures outlined above and illustrated in the drawings, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the invention. Therefore, the disclosure is intended to embrace all known or later developed alternatives, modifications, variations, improvements, and/or substantial equivalents. Some specific examples of potential alternatives, modifications, or variations in the described invention are provided below.

For example, rather than executing all of the processes in steps S67, S75, S77. S79, S81, S83, S85, S111, S113, and S115 described above with the data processing server 100, at least one of the processes may be executed on a device other than the data processing server 100, such as the multifunction peripheral 200 or the transaction server 400.

For example, while the multifunction peripheral 200 transmits a job ID generation request to the data processing server 100 in S19 and the data processing server 100 generates and assigns a job ID, the multifunction peripheral

200 may instead be configured to generate and assign the job ID and subsequently transmit this job ID to the data processing server 100.

Further, the multifunction peripheral 200 may be configured so that changes to print settings beginning from S95 cannot be executed once the payment screen 240P has been displayed in S89.

The printing system 1 may be configured to employ just a job ID and not the machine ID described above. Further, the data processing server 100 may be configured to transmit scan data to the multifunction peripheral 200 without transmitting a payment completion notification to the terminal 300 after confirming that payment has been completed in S113, for example, and the multifunction peripheral 200 may be configured to acquire this transmitted scan data and to determine that payment has been completed when scan data has been received.

The sequence diagrams shown in FIGS. 2, 3, 4, and 8 in the above description do not limit the present invention to the steps indicated therein. Steps may be added or deleted, or their order may be rearranged, without departing from the spirit and technical ideas of the invention.

In addition to what has already been described, the methods according to the embodiment and its variations described above may be used in suitable combinations.

In addition, although not illustrated individually, the present invention may be implemented with various modifications without departing from the spirit of the invention.

What is claimed is:

1. A printing system comprising:
   a printing device comprising:
      a reader configured to read a reading target;
      a printer configured to form an image on a printing medium; and
      a first controller;
   a data processing server comprising:
      a second controller; and
   a transaction server,
   wherein the first controller is configured to perform:
      reading a reading target using the reader to generate image data corresponding to the reading target;
      determining, based on a comparison between a threshold defined in capacity-related information and available capacity information describing available storage in a memory of the printing device, to set a data upload flag;
      determining a print setting used in association with the image data based, at least in part, on the image data; and
      based on the data upload flag indicating to upload the image data to the data processing server, transmitting the image data and the print setting to the data processing server,
   wherein the second controller is configured to perform:
      receiving the image data and the print setting from the printing device;
      in response to receiving the image data and the print setting from the printing device, determining a fee to be charged for forming an image on the printing medium based on the image data and the print setting;
      converting the image data to print data; and
      in response to determining the fee, transmitting fee information indicating the fee to the transaction server, wherein the second controller is configured to further perform:

in response to receiving payment information indicating a payment URL for payment of the fee from the transaction server, transmitting payment data corresponding to the payment URL indicated by the payment information to the printing device, wherein the first controller is configured to further perform:

receiving the payment data from the data processing server; and in response to receiving the payment data from the data processing server, outputting the payment data, wherein the second controller is configured to further perform:

in response to receiving confirmation that the payment of the fee is completed from the transaction server, transmitting the print data corresponding to the image data to the printing device, and wherein the first controller is configured to further perform:

receiving the print data from the data processing server corresponding to the image data; and in response to receiving the print data, forming the image corresponding to the print data on the printing medium with the printer.

2. The printing system according to claim 1,
wherein the second controller determines the fee based on a coverage value of the image data and the print setting.

3. The printing system according to claim 2,
wherein the data processing server further comprises:

a first memory configured to store correlation information associating a plurality of coverage ranges with respective ones of a plurality of fee values, and wherein the second controller determines the fee based on the coverage value of the image data and the print setting by referring the correlation information stored in the first memory.

4. The printing system according to claim 3,
wherein the second controller determines one coverage range from among the plurality of coverage ranges and sets the fee to one of the plurality of fee values associated with the one coverage range in the correlation information, the coverage value of the image data falling within the one coverage range.

5. The printing system according to claim 2,
wherein the printing device further comprises:

a user interface configured to accept a user operation, wherein the first controller is configured to further perform:

accepting via the user interface an input for the print setting, and wherein the first controller determines the print setting based on the input accepted via the user interface.

6. The printing system according to claim 5,
wherein the second controller is configured to further perform:

transmitting fee-related information related to the fee to the printing device, wherein the first controller is configured to further perform:

receiving the fee-related information transmitted from the data processing server;

accepting another input for a modified print setting via the user interface after receiving the fee-related information;

in response to accepting the another input, determining the modified print setting based on the another input, and transmitting the modified print setting to the data processing server, and wherein the second controller is configured to further perform:

receiving the modified print setting transmitted from the printing device; and in response to receiving the modified print setting, redetermining the fee based on the coverage value and the modified print setting.

7. The printing system according to claim 6,
wherein the first controller transmits data identification information for identifying the image data in association with the image data and the print setting, wherein the second controller further receives the data identification information transmitted from the printing device, and wherein the second controller transmits the fee-related information associated with the data identification information received from the printing device.

8. The printing system according to claim 6,
wherein the data processing server further comprises:

a second memory configured to store the image data, wherein the second controller is configured to further perform:

saving in the second memory the image data in association with data identification information for identifying the image data, wherein the first controller transmits the print setting in association with the data identification information, wherein the second controller further receives the data identification information transmitted in association with the print setting, wherein the second controller determines the fee by applying the print setting to the image data saved in the second memory in association with the data identification information received in association with the print setting, wherein the second controller transmits, while the image data is saved in the second memory, the fee-related information in association with the data identification information corresponding to the image data for which the fee is determined, wherein the first controller further receives the data identification information transmitted in association with the fee-related information, wherein the first controller transmits the modified print setting in association with the data identification information, wherein the second controller further receives the data identification information transmitted in association with the modified print setting, and wherein the second controller redetermines the fee by applying the modified print setting to the image data saved in the second memory in association with the data identification information received in association with the modified print setting.

9. The printing system according to claim 1,
wherein the first controller transmits data identification information for identifying the image data in association with the image data and the print setting, wherein the second controller further receives the data identification information transmitted in association with the image data and the print setting, and wherein the second controller determines the fee using the data identification information received from the printing device.

10. The printing system according to claim 9, wherein the printing device further comprises:
a display,
wherein the second controller is configured to further perform:
transmitting the payment information in association with the data identification information to the printing device, and
wherein the first controller is configured to further perform:
receiving the payment information associated with the data identification information transmitted from the data processing server; and
in response to receiving the payment information, displaying the payment of the fee on the display.

11. The printing system according to claim 10, wherein the second controller is configured to further perform:
determining whether the payment of the fee based on the payment information is completed; and
in response to determining that the payment of the fee is completed, transmitting complete information indicating that the payment of the fee is completed to the first controller.

12. The printing system according to claim 1, wherein the first controller transmits data identification information for identifying the image data in association with the image data and the print setting,
wherein the second controller further receives the data identification information transmitted in association with the image data and the print setting,
wherein the first controller is configured to further perform:
transmitting device identification information for identifying the printing device to the data processing server,
wherein the second controller is configured to further perform:
receiving the device identification information transmitted from the printing device;
in response to receiving the device identification information, storing the device identification information and the data identification information in association with each other; and
in response to the payment of the fee for printing based on the image data being completed, transmitting the print data to the printing device corresponding to the device identification information stored in association with the data identification information, the data identification information being received in association with the image data for which the payment of the fee is completed, and
wherein the first controller acquires the print data transmitted from the data processing server.

13. A printing device comprising:
a reader configured to read a reading target;
a printer configured to form an image on a printing medium; and
a controller configured to perform:
reading a reading target with the reader to generate image data corresponding to the reading target;
determining, based on a comparison between a threshold defined in capacity-related information and available capacity information describing available storage in a memory of the printing device, to set a data upload flag;
determining a print setting used in association with the image data based, at least in part, on the image data; and
based on the data upload flag indicating to upload the image data to a data processing server, transmitting the image data and the print setting to the data processing server;
receiving payment data from the data processing server;
in response to receiving the payment data from the data processing server, outputting the payment data;
receiving print data corresponding to the image data from the data processing server, the print data being generated at the data processing server in response to a payment of a fee to be charged for forming an image on the printing medium based on the image data being completed after the data processing server determines the fee; and
in response to receiving the print data, forming the image corresponding to the print data on the printing medium with the printer.

14. A printing system comprising:
a printing device comprising:
a reader configured to read a reading target;
a printer configured to form an image on a printing medium; and
a first controller
a data processing server comprising:
a second controller; and
a transaction server,
wherein the first controller is configured to perform:
reading a reading target using the reader to generate image data corresponding to the reading target;
determining, based on a comparison between a threshold defined in capacity-related information and available capacity information describing available storage in a memory of the printing device, to set a data upload flag; and
based on the data upload flag indicating to upload the image data to the data processing server, transmitting the image data to the data processing server,
wherein the second controller is configured to perform:
receiving the image data from the printing device;
in response to receiving the image data from the printing device, determining a print setting used in association with the image data based, at least in part, on the image data;
in response to determining the print setting, determining a fee to be charged for forming an image on the printing medium based on the image data and the print setting;
converting the image data to print data; and
in response to determining the fee, transmitting fee information indicating the fee to the transaction server,
wherein the second controller is configured to further perform:
in response to receiving the payment information from the transaction server, transmitting payment data corresponding to the payment URL indicated by the payment information to the printing device, wherein the first controller is configured to further perform:

receiving the payment data from the data processing server; and in response to receiving payment data from the data processing server, transmitting payment data corresponding to a payment URL indicated by the payment information to the printing device, wherein the second controller is configured to further perform:

in response to receiving confirmation that the payment of the fee is completed from the transaction server, transmitting the print data corresponding to the image data to the printing device, and wherein the first controller is configured to further perform:

receiving the print data from the data processing server corresponding to the image data; and in response to receiving the print data, forming the image corresponding to the print data on the printing medium with the printer.

15. The printing system according to claim 14, wherein the second controller determines the fee based on a coverage value of the image data and the print setting.

16. The printing system according to claim 15, wherein the second controller is configured to further perform:

determining whether a type of the image data received from the printing device is one of a photo and a text, wherein the second controller determines the print setting in response to determining that the type of the image data is one of the photo and the text, and wherein the second controller determines the fee based on the coverage value and the print setting.

17. The printing system according to claim 16, wherein the print setting includes at least one of: a printing color setting indicating a printing color; a number of pages to be printed; and a size of the printing medium.

* * * * *